US007503177B2

(12) United States Patent
Bland et al.

(10) Patent No.: US 7,503,177 B2
(45) Date of Patent: Mar. 17, 2009

(54) COMBUSTION DYNAMICS MONITORING

(75) Inventors: Robert J. Bland, Oviedo, FL (US); Clifford E. Johnson, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 361 days.

(21) Appl. No.: 11/378,027

(22) Filed: Mar. 17, 2006

(65) Prior Publication Data

US 2007/0214797 A1 Sep. 20, 2007

(51) Int. Cl.
*F02C 1/00* (2006.01)

(52) U.S. Cl. ............................ 60/772; 60/779; 701/29; 701/30; 702/182; 702/183; 702/184

(58) Field of Classification Search .................. 60/772, 60/779, 39.091; 701/29–30; 702/182–184
See application file for complete search history.

(56) References Cited

U.S. PATENT DOCUMENTS 4,249,372 A * 2/1981 White ......................... 60/796
5,544,478 A 8/1996 Shu et al.
5,755,819 A 5/1998 Bonanni et al.
6,205,764 B1 3/2001 Hermann et al.
6,354,071 B2 3/2002 Tegel et al.
6,877,307 B2 4/2005 Ryan et al.
7,194,382 B2 * 3/2007 Lieuwen ..................... 702/182
2002/0005037 A1 1/2002 Tegel et al.
2004/0211187 A1 10/2004 Catharine et al.

* cited by examiner

*Primary Examiner*—Michael Cuff
*Assistant Examiner*—Andrew Nguyen

(57) ABSTRACT

A method for monitoring combustion dynamics of a can annular combustor (12) of a gas turbine engine includes monitoring respective dynamic operating conditions of cans (16) of the can annular combustor with respective dynamic operating condition sensors (20) associated with each of the cans. The method also includes grouping the cans into two or more groups according to their respective dynamic operating conditions and identifying a sensor providing an anomalous dynamic operating condition reading for at least one of the cans. The method further includes determining a need to service the identified sensor according to the associated can's group membership.

19 Claims, 2 Drawing Sheets

COMBUSTION DYNAMICS MONITORING

FIELD OF THE INVENTION

The invention relates to gas turbine engines, and more particularly, to monitoring combustion dynamics when one or more dynamic operating condition sensors provides an anomalous reading.

BACKGROUND OF THE INVENTION

Gas turbines engines having can-annular combustors are known wherein individual cans, including a combustion zone within the can, feed hot combustion gas into respective individual portions of an arc of a turbine inlet. The individual cans may receive fuel and air for combustion and be disposed in a ring around a central region of a combustor of the engine. Combustion generated dynamic pressure fluctuations, or combustion dynamics, produced in gas turbine engines, and especially in gas turbine engines having Dry, Low NOx (DLN) combustion systems, need to be carefully monitored and controlled to achieve acceptable system durability and reliability. As DLN combustion systems are increasingly required to be operated more aggressively with regard to emissions and gas turbine cycling, the combustors tend to become less robust against these combustor dynamics. Consequently, system failures caused by excessive dynamics become possible. Typically, continuous monitoring of combustor dynamics with a combustion dynamics sensing system having internally mounted dynamic operating condition sensors are used to provide advance warning of excessive dynamics that may result in damage to combustion system. Failure of a dynamic condition sensor may require shutting down the engine to repair or replace the sensor. Such shutdowns may be prohibitively costly in gas turbine power generation applications due to power generation revenue loss while the engine is shut down for sensor repair.

BRIEF DESCRIPTION OF THE DRAWINGS

The invention is explained in following description in view of the drawings that show.

DETAILED DESCRIPTION OF THE INVENTION

The inventors of the present invention have innovatively recognized that a level of threat to engine health from excessive dynamics may be gauged even when one or more dynamic condition sensors may be malfunctioning. By monitoring signals provided by dynamic sensors and assigning respective risk levels based on the monitored signals, an immediate need to service a malfunctioning sensor may be determined based on an assigned risk level. Accordingly, shut down of the engine to repair the failed sensor may be scheduled based on the risk level. For example, if a risk level is relatively low for a failed sensor, then engine shutdown and repair may be advantageously scheduled during an off-peak power producing time to minimize revenue loss.

Figure 2:
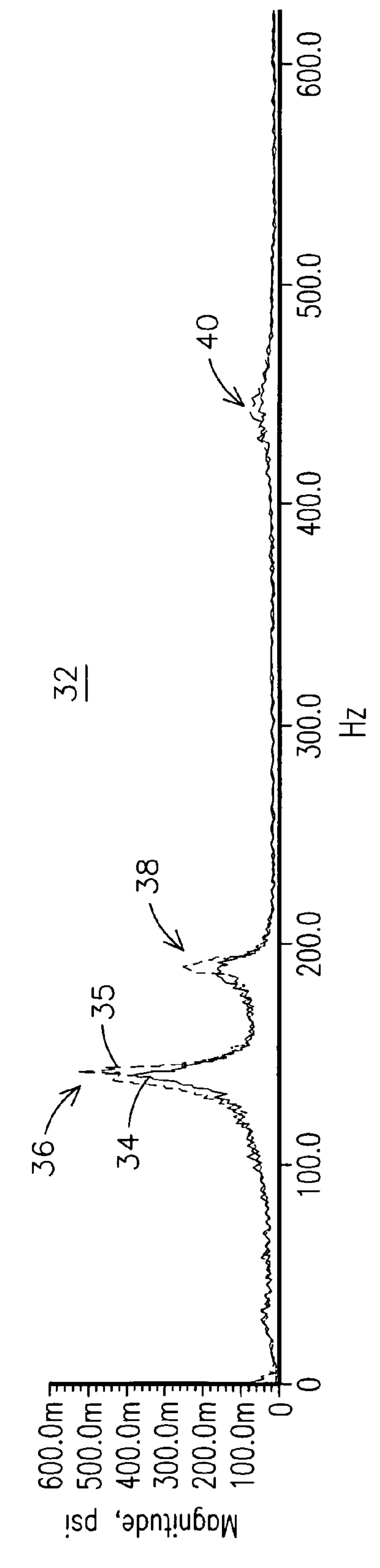
FIG. 2 shows an example frequency spectrum of a Fourier-transformed acoustic waveform signal for a conventional DLN-type can annular combustor.

Individual cans of a can annular combustor of a gas turbine engine may exhibit amplitude spikes at certain acoustic frequencies during operation. FIG. 2 shows an example frequency spectrum 32 of Fourier-transformed acoustic waveform signals 34, 35 for two adjacent cans of a conventional DLN-type can annular combustor. IN FIG. 2, waveform signal 34 represents a frequency response of one can of a can annular combustor, and waveform signal 35 represents a frequency response of another can of the can annular combustor. As shown in FIG. 2, amplitude spikes 36, 38, 40 for each of the cans occur at about 140 Hz, 190 Hz, and 440 Hz, respectively, for example, when the gas turbine engine is operated at base load. These frequency bands may change as a load on the turbine changes, and different cans may have different responses under different loading conditions.

Typically, some cans of a can annular combustor are noisier than other cans, i.e., they may have higher amplitude spikes at certain frequencies that other, quieter cans. For example, as shown in FIG. 2, the amplitude spikes for waveform signal 35 have greater values than the amplitude spikes of waveform signal 34, indicating that the can exhibiting waveform signal 35 is noisier than the can wave exhibiting waveform signal 34. In day to day operations, it has been observed that the nosier cans tend to remain at their noisy, or relatively higher amplitude spike levels, over time. Accordingly, the inventors have recognized that a noise level ranking for each can of a can annular combustor may be established over time based on acoustic response relationships with one another. In addition, a propensity for a certain can to trigger a dynamic limit excursion alarm event may be measured based on how often the can has exceeded dynamic limits in the past.

Figure 1:
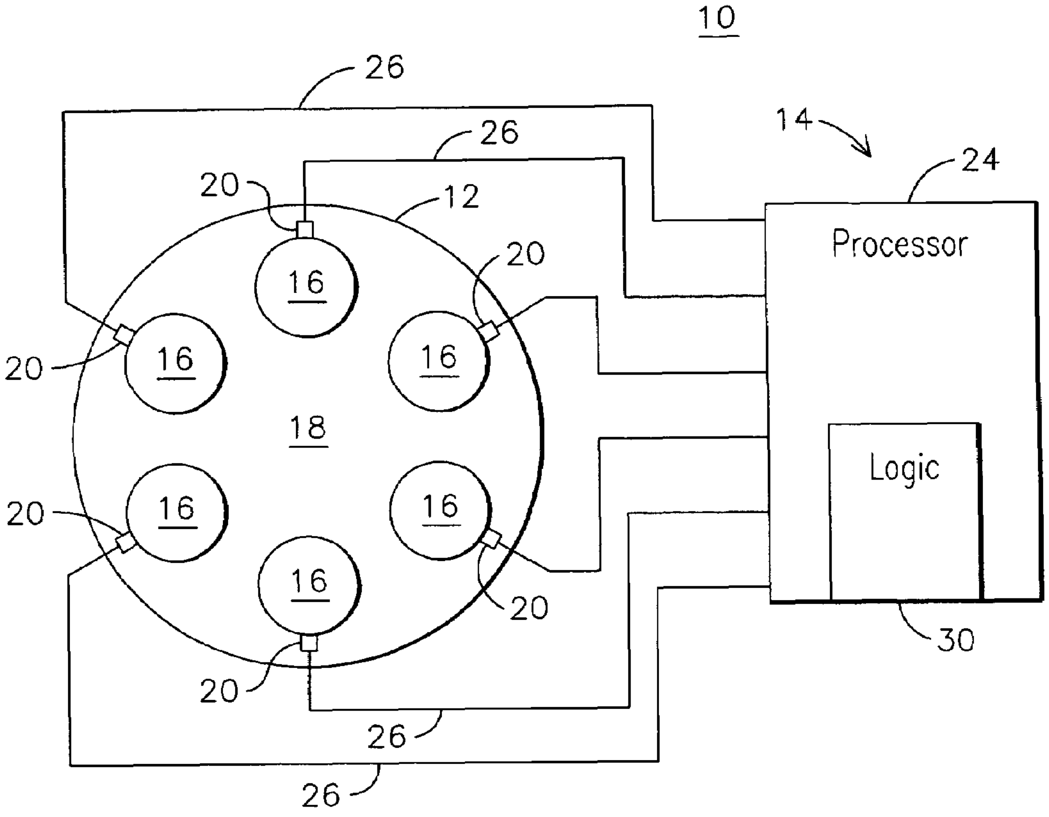
FIG. 1 is a schematic cross sectional diagram of a can annular combustor of a gas turbine engine including a system for monitoring combustion dynamics when one or more dynamic operating condition sensors provides an anomalous reading.

FIG. 1 is a schematic cross sectional diagram of a can annular combustor 12 of a gas turbine engine (not shown) including a system 14 for monitoring combustion dynamics when one or more of the dynamic operating condition sensors 20 of the combustion dynamics sensing system 10 provides an anomalous reading. The combustor 12 includes a plurality of combustor cans 16 disposed in a ring about a central region 18 of the combustor 12. Fuel and air are typically mixed and combusted in each of the combustor cans and hot combustion gases produced by each of the cans are fed into a downstream turbine (not shown) to extract power from the hot combustion gases.

As a result of combustion, the cans 16 are subjected to a variety of combustion effects. For example, the cans 16 may be subject to combustion dynamics that may be detrimental to operation of the combustor 12. Combustor dynamic sensing systems 10 are typically used to monitor dynamic operating conditions of the combustor 12, such as the dynamic operating conditions of each of the cans 16 of a can annular combustor 12. A combustor dynamics sensing system 10 may include a plurality of dynamic operating condition sensors 20 disposed proximate the cans 16 to sense respective dynamic operating conditions of the cans 20. In one embodiment, dynamic operating condition sensors 20 may include a pressure sensor, an acoustic sensor, an electromagnetic energy sensor, an optical sensor, or other type of sensor known in the art for sensing a combustion dynamic parameter responsive to combustion dynamics in the cans 16 of the combustor 12. The sensors 20 may provide raw signals 26 responsive to the respective combustion dynamics to a processor 24. Processor 24 may take any form known in the art, for example an analog or digital microprocessor or computer, and it may be integrated into or combined with one or more controllers used for other functions related to an operation of the gas turbine engine. The processor 24 may perform signal processing of the received signals 26, such as by executing a Fast Fourier Transform (FFT) on the received signals 26 to generate amplitude and phase information in the frequency domain, such as shown in FIG. 2, from which combustion dynamics of the respective cans 16 may be determined.

In an embodiment of the invention, the processor 24 may be configured to monitor dynamic operating condition relationships responsive to combustion in respective cans of a can annular combustor to determine a need to service a dynamic condition sensor identified as providing anomalous readings. For example, the processor 24 may be configured to rank, or group, the cans into risk categories, based on frequency response amplitude spike values at a certain frequency or frequencies, or based on an amplitude values within a certain frequency range. The processor 24 may be configured to group cans regardless of a loading condition on the gas turbine engine. In another embodiment, the processor 24 may be configured to group cans corresponding to certain loading conditions, or bands of loading condition, such that cans may be grouped differently depending on a loading condition of the engine. The steps necessary for such processes may be embodied in programmable logic 30 accessible by the processor 24. The logic 30 may be embodied in hardware, software and/or firmware in any form that is accessible and executable by processor 24 and may be stored on any medium that is convenient for a particular application.

The steps may include monitoring respective dynamic operating conditions of combustor cans with respective dynamic operating condition sensors associated with each of the cans. In an aspect of the invention, the dynamic operating conditions comprise frequency responses of each of the cans. The dynamic operating conditions may be monitored within a frequency range associated with a spiked, or peak, dynamic frequency response condition. For example, frequency ranges of about 120 Hz to about 220 Hz and about 400 Hz to about 500 Hz may be monitored. Other frequencies and/or frequencies ranges may be monitored as desired. Monitoring may include obtaining raw signals responsive to combustion in a plurality of the cans, and then performing a transformation operation, such as an FFT on the raw signals, to generate respective frequency response information corresponding to each signal.

The steps may also include grouping the cans into two or more groups according to their respective dynamic operating conditions. For example, the cans may be grouped according to a risk level, wherein a noisier can is assigned to a higher risk group than a quieter can. The step of grouping the cans may include calculating an average of the frequency responses of each of the cans and then calculating a variance of each of the frequency responses away from the average to establish group member ship. Group membership may then be assigned according to degrees of variance away from the average. For example, cans exhibiting a larger degree of variance away from the average may be grouped in a higher risk group than cans exhibiting a smaller degree of variance. The higher risk group may represent cans that are operating closer to a dynamic limit than other cans and thus may require closer monitoring, which may indicate a need to replace the sensor sooner than a can in a low risk group. In another embodiment, the cans may be grouped according to how often a certain can exceeds a predetermined dynamic limit. A can frequently exceeding a dynamic limit may be assigned to a high risk group, for example, regardless of its dynamic operating condition relationship with other cans of the combustor.

The steps performed by the processor 24 may further include identifying a sensor providing an anomalous dynamic operating condition reading for at least one of the cans and then determining a need to service the identified sensor according to the associated can's group membership. For example, determining a need to service the identified sensor may include identifying a group membership of the can associated with the sensor, and if the can is a member of a high risk group, indicating a need to service the identified sensor sooner than if the can is in a lower risk group. If the identified sensor is a member of a low risk group, the engine may be allowed to continue to operate until a later time for sensor maintenance. When the engine is allowed to continue to operate, a variance previously determined for the can prior to sensor failure may be used for dynamic control purposes. In another aspect, dynamic limits may be adjusted to be more conservative when the engine is allowed to continue to operate. In yet another aspect, cans neighboring a can having a failed sensor may be more closely monitored to determine a dynamic condition of the can having the failed sensor. If neighboring cans become more active, such an increase may indicate that the can having the failed sensor has become more active and may require more immediate maintenance. Consequently, an alert may be generated that the can associated with the sensor providing an anomalous dynamic operating may be experiencing an elevated dynamic operating condition.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for monitoring combustion dynamics of a can annular combustor comprising:

monitoring respective dynamic operating conditions of a plurality of combustor cans of a can annular combustor of a gas turbine engine with respective dynamic operating condition sensors associated with each of the cans;

determining respective dynamic operating conditions of each combustor can as exhibited over time;

grouping the cans into two or more risk level groups according to their respective dynamic operating conditions as exhibited over time;

identifying a malfunctioning dynamic operating condition sensor for at least one of the cans; and determining a need to service the identified sensor according to the associated can's risk level group membership.

2. The method of claim 1, wherein the dynamic operating conditions comprise respective frequency responses of the cans.

3. The method of claim 2, further comprising determining an average of the respective frequency responses of the cans.

4. The method of claim 3, further comprising determining a variance of the respective frequency responses away from the average.

5. The method of claim 4, further comprising establishing the risk level groups according to respective degrees of variance away from the average.

6. The method of claim 5, wherein determining a need to service the identified sensor further comprises identifying the risk level group membership of the can associated with the identified sensor.

7. The method of claim 6, further comprising indicating a need to service the identified sensor when the can associated with the identified sensor is a member of a group having a relatively high variance.

8. The method of claim 6, further comprising allowing continued operation of the combustor when the can associated with the identified sensor is a member of a group having a relatively low variance.

9. The method of claim 1, further comprising monitoring the dynamic operating conditions within a frequency range associated with a peak dynamic frequency condition.

10. The method of claim 9, wherein the frequency range extends from about 120 Hertz to about 220 Hertz.

11. The method of claim 9, wherein the frequency range extends from about 400 Hertz to about 500 Hertz.

12. The method of claim 1, further comprising adjusting a predetermined dynamic limit for at least one of the cans when at least one sensor is identified as malfunctioning.

13. The method of claim 1, wherein the risk level groups are established according to respective dynamic operating conditions as exhibited over time during demand load on the combustor.

14. The method of claim 1, wherein a can's risk level group membership is established according to a frequency of the can exceeding its predetermined dynamic operating condition limit.

15. The method of claim 1, further comprising identifying an elevated dynamic operating condition of a can neighboring a can associated with a sensor identified as malfunctioning.

16. The method of claim 15, further comprising generating an alert when a malfunctioning sensor is identified.

17. A system for monitoring combustion dynamics of a can annular combustor comprising:

a plurality of sensors for monitoring respective dynamic operating conditions of cans of a can annular combustor of a gas turbine engine;

a processor receiving respective sensed dynamic operating condition signals from the plurality of sensors; and programmed logic operable with the processor for:

determining respective dynamic operating conditions of each combustor can as exhibited over time;

grouping the cans into two or more risk level groups according to their respective dynamic operating conditions as exhibited over time;

identifying a malfunctioning dynamic operating condition sensor for at least one of the cans; and determining a need to service the identified sensor according to the associated can's risk level group membership.

18. A method for monitoring combustion dynamics of a can annular combustor comprising:

obtaining raw signals from a plurality of sensors responsive to combustion in respective cans of a can annular combustor of a gas turbine engine;

performing a transformation operation on me raw signals to generate respective frequency response information corresponding to each signal;

determining respective frequency response information of each combustor can as exhibited over time;

grouping the cans into two or more risk level groups according to their respective frequency response information as exhibited over time;

identifying a malfunction dynamic operating condition sensor for at least one of the cans; and determining a need to service the identified sensor according to the associated can's risk level group membership.

19. The method of claim 18, wherein the transformation operation comprises a Fourier transform.

* * * * *